(12) United States Patent
Kumar

(10) Patent No.: US 11,823,366 B2
(45) Date of Patent: Nov. 21, 2023

(54) SYSTEM AND METHOD FOR ANOMALY DETECTION USING IMAGES

(71) Applicant: Wipro Limited, Bangalore (IN)

(72) Inventor: Kodavalla Vijay Kumar, Bangalore (IN)

(73) Assignee: Wipro Limited, Bangalore (IN)

( * ) Notice: Subject to any disclaimer, the term of this patent is extended or adjusted under 35 U.S.C. 154(b) by 408 days.

(21) Appl. No.: 17/184,915

(22) Filed: Feb. 25, 2021

(65) Prior Publication Data

US 2022/0207691 A1   Jun. 30, 2022

(30) Foreign Application Priority Data

Dec. 28, 2020   (IN) .............................. 202041056616

(51) Int. Cl.
| | | |
|---|---|---|
| *G06T 7/00* | (2017.01) | |
| *G06F 18/23* | (2023.01) | |
| *G06F 18/214* | (2023.01) | |
| *G06F 18/21* | (2023.01) | |

(52) U.S. Cl.
CPC .......... *G06T 7/0002* (2013.01); *G06F 18/214* (2023.01); *G06F 18/217* (2023.01); *G06F 18/23* (2023.01); *G06T 2207/20081* (2013.01)

(58) Field of Classification Search
CPC ..... H04L 63/1433; H04L 41/16; G06V 10/82; G06V 2201/03; G06V 20/176
See application file for complete search history.

(56) References Cited

U.S. PATENT DOCUMENTS

| | | | |
|---|---|---|---|
| 10,692,211 B2 | 6/2020 | Madabhushi et al. | |
| 11,386,075 B2* | 7/2022 | Schierz | .............. G06Q 10/0635 |
| 11,416,711 B2* | 8/2022 | Ivanov | ............. G06V 30/19147 |
| 2013/0022242 A1* | 1/2013 | Cobb | ..................... G06V 20/52 |
| | | | 382/103 |
| 2021/0174492 A1* | 6/2021 | Karaaslan | ............. G06T 7/0004 |
| 2022/0172100 A1* | 6/2022 | Balasubramanian | ........................ |
| | | | G06V 10/7788 |

OTHER PUBLICATIONS

Zhu, Zhenhua & Brilakis, Ioannis. Concrete Column Recognition in Images and Videos. Journal of Computing in Civil Engineering—J Comput Civil Eng. 24. 10.1061/(ASCE)CP.1943-5487.0000053. (Year: 2010).*

Ahsan, M. et al., "Study of Different Deep Learning Approach with Explainable AI for Screening Patients with COVID-19 Symptoms: Using CT Scan and Chest X-Ray Image Data Set", A-Reprint Jul. 27, 2020 (21 pages).

(Continued)

*Primary Examiner* — Ross Varndell
(74) *Attorney, Agent, or Firm* — Finnegan, Henderson, Farabow, Garrett & Dunner, LLP

(57) ABSTRACT

The present invention relates to a method of detecting an anomaly using a plurality of images. The method comprises determining a subset of images from the plurality of images, comprising one or more first features. Further, one or more regions comprising one or more second features are identified in each image from the subset of images. Finally, detecting the anomaly from the subset of images based on the one or more regions. Therefore, accuracy of detecting anomalies is increased by using the subset of images.

15 Claims, 10 Drawing Sheets

(56) References Cited

OTHER PUBLICATIONS

El-Bana, S. et al., "A Two-Stage Framework for Automated Malignant Pulmonary Nodule Detection in CT Scans", Diagnostics 2020, 10, 131 (pp. 1-19).
Li, Y. et al., "Coronovirus Disease 2019 (COVID-19): Role of Chest CT in Diagnosis and Management", AJR:214, Jun. 2020, (pp. 1280-1286).
Singh, D et al., "Classification of COVID-19 Patients from Chest CT Scans Images Using Multi-Objective Differential Evolution-Based Conventional Neural Networks", European Journal of Clinical Microbiology & Infections Diseases, 2020 39 (pp. 1379-1389).
Wang, S. et al., "A Fully Automatic Deep Learning System for COVID-19 Diagnostics and Prognostic Analysis", European Respiratory Journal, 2020 (44 pages).

\* cited by examiner

| FIRST SET OF TRAINING IMAGES 401 | FIRST LABEL 402 |
|---|---|
| ▭ | PRESENT |
| ▭ | ABSENT |
| ⋮ | ⋮ |
| ▭ | PRESENT |

| TYPE 414 | COUNT 416 | FIRST SCORE 415 | OUTLIER 417 |
|---|---|---|---|
| TYPE - 1 | 15 | 89%, 76%, ...., 91% | NO |
| TYPE – 2, | 4 | 34%, 6%, 17%, and 29% | YES |
| ⋮ | ⋮ | ⋮ | ⋮ |
| TYPE - N | 1 | 43% | YES |
| NO ANOMALY | 2 | 13% and 21% | YES |

FIGURE 4I

SYSTEM AND METHOD FOR ANOMALY DETECTION USING IMAGES

TECHNICAL FIELD

The present disclosure relates to the field of computer vision and image processing. Particularly, but not exclusively, the present disclosure relates to a method for detecting anomaly using images.

BACKGROUND

Generally, detecting anomalies from a collection of images is performed in various domains. For example, anomaly detection is used to identify manufacturing defects in articles such as shoes, apparel, containers, and the like. In another example, the anomaly detection is used to identify cracks in constructions. In yet another example, the anomaly detection is used to identify the presence and type of disease from medical images. Conventionally, anomaly detection was performed manually by human inspection. Detecting anomalies by human inspection is not accurate, not cost-effective, and leads to an increased delay when a count of images is higher such as a few tens or hundreds of images.

Existing techniques use one or more image processing techniques such as image segmentation and Artificial Intelligence (AI) based techniques such as neural networks for anomaly detection using images. However, the accuracy of the anomaly detection using the existing techniques reduces when there is a wide range of variations such as missing anomalies in the images, distorted images of anomalies, partial presence of anomalies in the images and the like. The wide range of variations in the images leads to incorrect anomaly detection and/or anomaly detection with low confidence scores. Therefore, there is a need for an efficient technique for performing anomaly detection when the wide range of variations are present in the images.

The information disclosed in this background of the disclosure section is only for enhancement of understanding of the general background of the invention and should not be taken as an acknowledgement or any form of suggestion that this information forms the prior art already known to a person skilled in the art.

SUMMARY

Other embodiments and aspects of the disclosure are described in detail herein and are considered a part of the claimed disclosure.

Disclosed herein is a method for detecting an anomaly using a plurality of images. The method comprising determining a subset of images from the plurality of images, comprising one or more first features. Further, the method comprises identifying one or more regions comprising one or more second features in each image from the subset of images. Finally, the method comprises detecting the anomaly from the subset of images based on the one or more regions.

Embodiments of the present disclosure discloses an anomaly detection system for detecting an anomaly using a plurality of images. The anomaly detection system comprises a processor and a memory communicatively coupled to the processor. The memory stores the processor instructions, which, on execution, causes the processor to determine a subset of images from the plurality of images, comprising one or more first features. Further, the instructions cause the processor to identify one or more regions comprising one or more second features in each image from the subset of images. Finally, the instructions cause the processor to detect the anomaly from the subset of images based on the one or more regions.

Embodiments of the present disclosure discloses a non-transitory computer readable medium including instructions stored thereon that when processed by at least one processor cause a device to perform operations comprising determining a subset of images from the plurality of images, comprising one or more first features. Further, identifying one or more regions comprising one or more second features in each image from the subset of images. Finally, detecting the anomaly from the subset of images based on the one or more regions.

The foregoing summary is illustrative only and is not intended to be in any way limiting. In addition to the illustrative aspects, embodiments, and features described above, further aspects, embodiments, and features may become apparent by reference to the drawings and the following detailed description.

BRIEF DESCRIPTION OF THE ACCOMPANYING DRAWINGS

The novel features and characteristic of the disclosure are set forth in the appended claims. The disclosure itself, however, as well as a preferred mode of use, further objectives and advantages thereof, may best be understood by reference to the following detailed description of an illustrative embodiment when read in conjunction with the accompanying drawings. The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. One or more embodiments are now described, by way of example only, with reference to the accompanying figures wherein like reference numerals represent like elements and in which:

FIG. 4I shows an exemplary table illustrating consolidated output of the third model, in accordance with some embodiments of the present disclosure.

Figure 1:
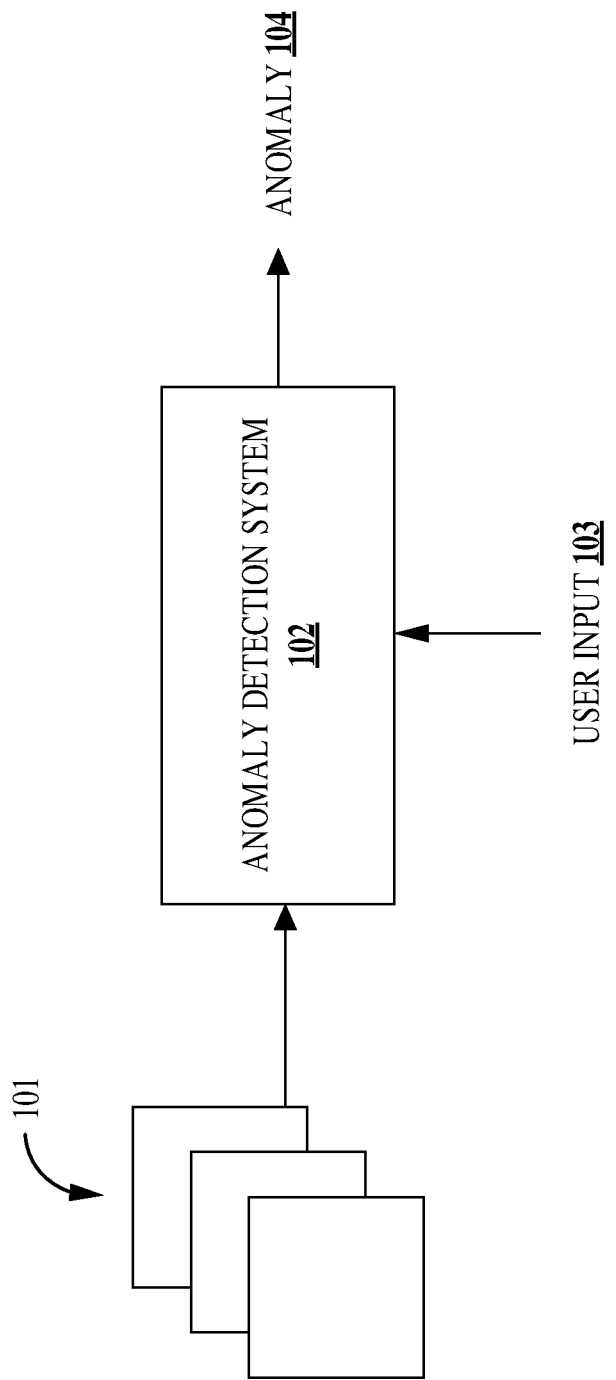
FIG. 1 shows an exemplary environment for detecting an anomaly using a plurality of images, in accordance with some embodiments of the present disclosure.

It should be appreciated by those skilled in the art that any block diagrams herein represent conceptual views of illustrative systems embodying the principles of the present subject matter. Similarly, it may be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and may be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "includes" "comprising", "including" or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" or "includes . . . a" does not, without more constraints, preclude the existence of other elements or additional elements in the system or apparatus.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary environment for detecting an anomaly using a plurality of images, in accordance with some embodiments of the present disclosure.

In an embodiment, an anomaly detection system (102) is used for detecting an anomaly (104) using a plurality of images (101). The anomaly detection system (102) may be implemented in a server, a smartphone, a computer, and the like. The plurality of the images (101) may be provided in real-time to the anomaly detection system (102). In another embodiment, the plurality of the images (101) may be obtained from a storage medium (not shown in the figure) such as a database, a Universal Serial Bus (USB) based hard disk, a compact disk, and the like associated with the anomaly detection system (102). The plurality of images (101), for example, may include at least one of a color image, a grayscale image, an infrared image, an X-ray image, a computed tomography image, a magnetic resonance imaging based image, a nuclear medicine imaging based image, an ultrasound image, and the like. The above-mentioned categories of plurality of images (101) should not be considered as a limitation rather be considered as examples. The person skilled in the art appreciates the use of other categories of images in addition to the above-mentioned examples.

In an embodiment, the anomaly (104) detected by the anomaly detection system (102) may include, for example, at least one of bank fraud, a structural defect, medical disease or disorder, an intrusion detection, and the like. The person skilled in the art appreciates the use of the anomaly detection system (102) to detect the anomaly (104) in various domains in addition to the above-mentioned examples. In one implementation, the anomaly detection system (102) determines a subset of images from the plurality of images (101). The subset of images includes one or more first features. In an embodiment, the objects in which a defect or an anomaly is expected are identified by the anomaly detection system (102). For example, if the plurality of images (101) is associated with objects like buildings, bridges, towers, and the like, then the subset of images may include one or more images from the plurality of images (101) having a complete visibility of the objects. The identification of the one or more images having the complete visibility of the objects such as the edges of the objects, is indicative of the one or more first features. Alternatively, the one or more images from the plurality of images (101) having a partial visibility of the objects is not included in the subset of images.

In an embodiment, for each image from the subset of images, the anomaly detection system (102) may identify one or more regions comprising one or more second features. The one or more regions are where an anomaly is expected. For example, a location of a beam in the bridge, a location of a pillar of the tower, and the like associated with the objects in the subset of images may indicate the one or more regions. Further, the one or more second features may be identified based on a variation in the pixel values in the subset of images. For example, the pixel values in the one or more regions associated with the beam, the pillar, and the like may have lower values when compared with the pixel values other than the one or more regions.

In an embodiment, the anomaly detection system (102) may detect the anomaly (104) from the subset of images based on the one or more regions. The anomaly detection system (102) detects the anomaly (104) using the one or more second features present in the one or more regions. For example, the anomaly (104) detected from the one or more second features may indicate a presence or an absence of the structural defect and a type of the structural defect such as "the crack", "water seepage" and the like when the presence of the structural defect is detected.

In an embodiment, the anomaly detection system (102) may use one or more Artificial Intelligence (AI) based techniques to determine the subset of images from the plurality of images (101), identify the one or more regions comprising the one or more second features and detect the anomaly (104) from the subset of images using the one or more second features. For example, a first model implementing one or more AI techniques may be used to determine the subset of images from the plurality of images (101), a second model implementing one or more AI techniques may be used to identify the one or more regions comprising the one or more second features and a third model implementing one or more AI techniques may be used to detect the anomaly (104) from the subset of images using the one or more second features. The AI based techniques may include at least one of a supervised learning based model, an unsupervised learning based model, and a reinforcement learning based model. For example, the AI based techniques may include at least one of deep neural networks such as Convolutional Neural Networks (CNN), Recurrent Neural Networks (RNN), Long Short-Term Memory (LSTM), autoencoders, and the like. In another example, the AI based techniques may include support vector machines, decision trees, Naive Bayes Classifier, Random Forest, logistic regression, k-means clustering, Density-Based Spatial Clustering (DBSCAN), and the like.

In an embodiment, the anomaly detection system (102) may receive the user input (103) indicating the one or more AI techniques to be used for determining the subset of images, identifying the one or more regions, and detecting the anomaly (104) from the subset of images. In a first example, the user input (103) may indicate the anomaly detection system (102) to use a CNN with AlexNet architecture as the first model to determine the subset of images from the plurality of images (101). In a second example, the user input (103) may indicate the anomaly detection system (102) to use the k-means clustering technique as the second model to identify the one or more regions in the subset of images. In a third example, the user input (103) may indicate the anomaly detection system (102) to use the support vector machines as the third model to detect the anomaly (104) from the subset of images.

Figure 2:
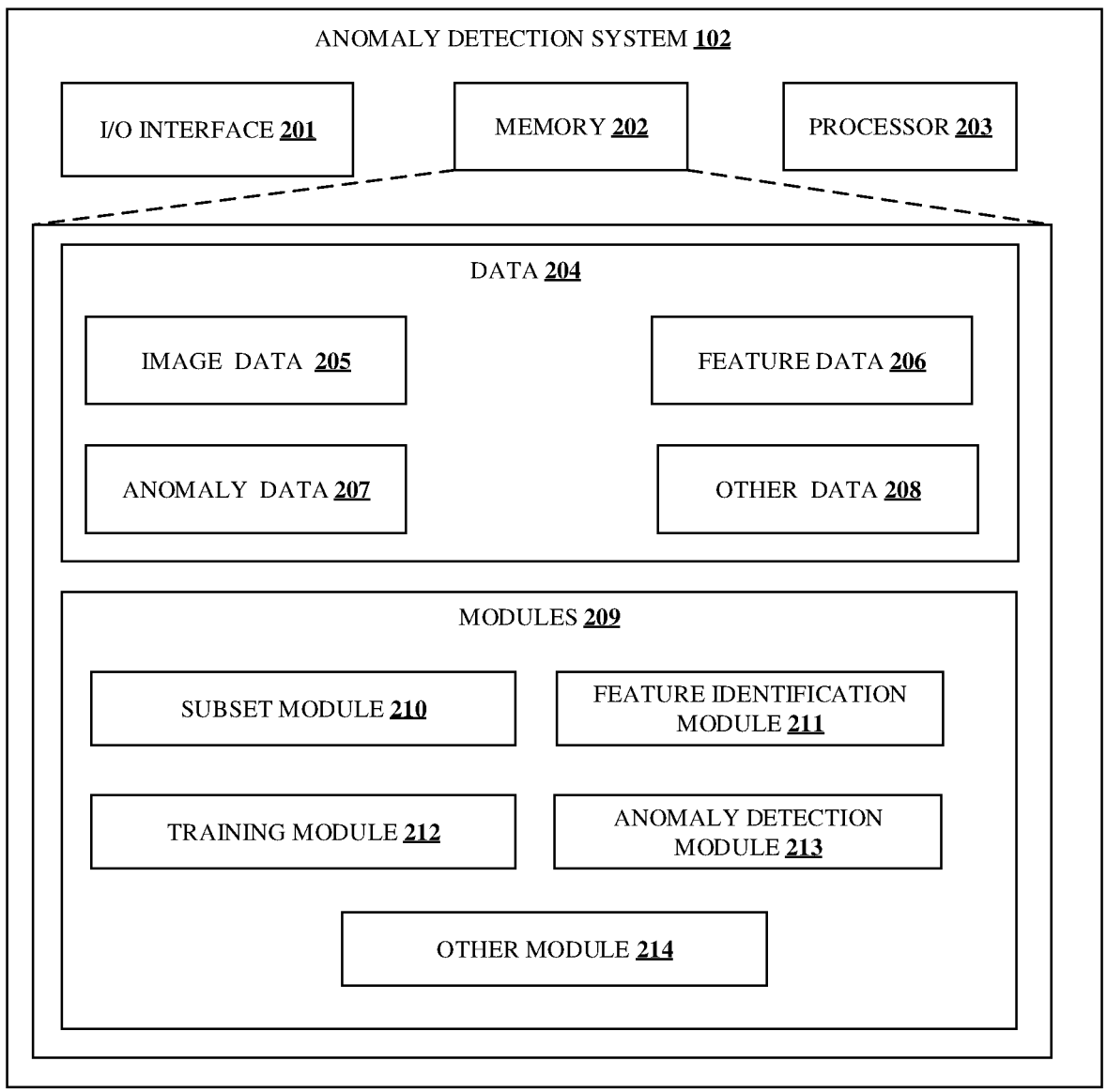
FIG. 2 shows a detailed block diagram of an anomaly detection system, in accordance with some embodiments of the present disclosure.

FIG. 2 shows a detailed block diagram of the anomaly detection system (102), in accordance with some embodiments of the present disclosure.

The anomaly detection system (102) may include a Central Processing Unit ("CPU" or "processor") (203) and a memory (202) storing instructions executable by the processor (203). The processor (203) may include at least one data processor for executing program components for executing user or system-generated requests. The memory (202) may be communicatively coupled to the processor (203). The anomaly detection system (102) further includes an Input/Output (I/O) interface (201). The I/O interface (201) may be coupled with the processor (203) through which an input signal or/and an output signal may be communicated. In one embodiment, the plurality of the images (101), and the user input (103) may be received through the I/O interface (201).

In some implementations, the anomaly detection system (102) may include data (204) and modules (209). As an example, the data (204) and modules (209) may be stored in the memory (202) configured in the anomaly detection system (102). In one embodiment, the data (204) may include, for example, an image data (205), feature data (206), anomaly data (207), and other data (208). In the illustrated FIG. 2, data (204) are described herein in detail.

In an embodiment, the image data (205) may include the plurality of images (101), the subset of images, a first set of training images, and a second set of training images. The plurality of images (101) indicates the images obtained as the user input (103) for detecting the presence or the absence of the anomaly (104) and the type of the anomaly (104). Further, the subset of images indicates the one or more images from the plurality of images (101) where the presence of the anomaly (104) is expected. Furthermore, the first set of training images and the second set of training images indicates the images, corresponding first label and a second label used to train the first model and the third model respectively. The first label indicates the presence of the one or more first features and the second label indicates an actual anomaly, and the type of the actual anomaly in the first set of training images and the second set of training images respectively.

In an embodiment, the feature data (206) may include the one or more first features used by the first model for determining the subset of images. Further, the feature data (206) may include one or more clusters identified by the second model. Furthermore, the feature data (206) may include one or more second features used by the third model for detecting the anomaly (104) and the type of anomaly (104).

In an embodiment, the anomaly data (207) may include the anomaly (104) and the type of anomaly (104) detected in the subset of images. Further, the anomaly data (207) may include a count of occurrences of each type of the anomaly (104) from the subset of images and a first score associated with the anomaly (104) detected. The first score may indicate a confidence value associated with the output of the third model.

In an embodiment, the other data (208) may include one or more first parameters associated with the first model, one or more second parameters associated with the third model, a first error associated with the first model, a second error associated with the third model, the output of the first model, the output of the third model, and the like.

In some embodiments, the data (204) may be stored in the memory (202) in the form of various data structures. Additionally, the data (204) may be organized using data models, such as relational or hierarchical data models. The other data (208) may store data, including temporary data and temporary files, generated by the modules (209) for performing the various functions of the anomaly detection system (102).

In some embodiments, the data (204) stored in the memory (202) may be processed by the modules (209) communicatively coupled to the processor (203) of the anomaly detection system (102). The modules (209) may be stored within the memory (202) as shown in FIG. 2. In one embodiment, the modules (209) may be present outside the memory (202) and implemented as hardware. As used herein, the term modules (209) may refer to an Application Specific Integrated Circuit (ASIC), a Field Programmable Gate Array (FPGA), an electronic circuit, a processor (shared, dedicated, or group) that execute one or more software or firmware programs, a combinational logic circuit, and/or other suitable components that provide the described functionality.

In one implementation, the modules (209) may include, for example, a subset module (210), a feature identification module (211), a training module (212), an anomaly detection module (213), and other module (214). It may be appreciated that such aforementioned modules (209) may be represented as a single module or a combination of different modules.

In an embodiment, the subset module (210) is configured for determining the subset of images by providing each image from the plurality of images (101) as an input to the first model. The first model is pre-trained to identify the one or more first features in the plurality of images (101). Further, the subset module (210) is configured for categorizing each image as belonging to the subset of images or not belonging to the subset of images based on an output of the first model.

In an embodiment, the feature identification module (211) is configured for identifying the one or more regions by categorizing each pixel of each image from the subset of images into one or more clusters using the second model. Further, the feature identification module (211) is configured for identifying at least one cluster from the one or more clusters indicate the presence of one or more second features. Furthermore, the feature identification module (211) is configured for determining a plurality of pixels corresponding to the at least one cluster for each image, where the plurality of pixels indicate the one or more regions.

In an embodiment, the training module (212) is configured for training the first model by providing the first set of training images as the input to the first model, where a first label associated with each image in the first set of training images indicates the presence of the one or more first features. Further, the one or more first features in each image from the first set of training images is detected. The one or more first features indicates the output of the first model. Furthermore, a first error associated with the first model is determined based on a comparison between the output of the first model and the corresponding first label for the first set of training images. Thereafter, the one or more first parameters associated with the first model is modified based on the first error. In another embodiment, the training module (212) is configured for training the third model by identifying the one or more regions comprising one or more second features in each image from a second set of training images. Further, the one or more regions of the each image from the second set of training images is provided as the input to the third model. The second label associated with each image from the second set of training images indicates an actual anomaly, and the type of the actual anomaly. Furthermore, the anomaly (104) and the type of the anomaly (104) is detected based on the one or more second features in the one or more regions. The anomaly (104) detected, and the type of the anomaly (104) indicates the output of the third model. Thereafter, the second error associated with the third model is determined based on a comparison between the output of the third model and the corresponding second label associated with the second set of training images. Subsequently, one or more second parameters associated with the third model is modified based on the second error.

In an embodiment, the anomaly detection module (213) is configured for detecting the anomaly (104) by providing the one or more regions of the each image as the input to the third model. Where the third model is pre-trained to detect the anomaly (104), the type of the anomaly (104) and the first score associated with the anomaly (104) detected based on one or more second features. Further, the anomaly detection module (213) is configured for consolidating the output of the third model by computing the count of occurrences of each type of the anomaly (104) in the subset of images and discarding the type of anomaly (104) identified as outliers based on the count of occurrences and the first score. Furthermore, the anomaly detection module (213) is configured for aggregating the first score associated with the each type of the anomaly (104) after discarding the outliers. Thereafter, the anomaly detection module (213) is configured for determining the anomaly (104) and the type of the anomaly (104) based on the aggregated first score.

In an embodiment, the other module (214) may be used to receive the user input (103) and select the one or more AI based techniques corresponding to the first model, second model, and the third model for determining the subset of images from the plurality of images (101), identifying the one or more regions comprising the one or more second features and detect the anomaly (104) from the subset of images using the one or more second features respectively.

Figure 3:
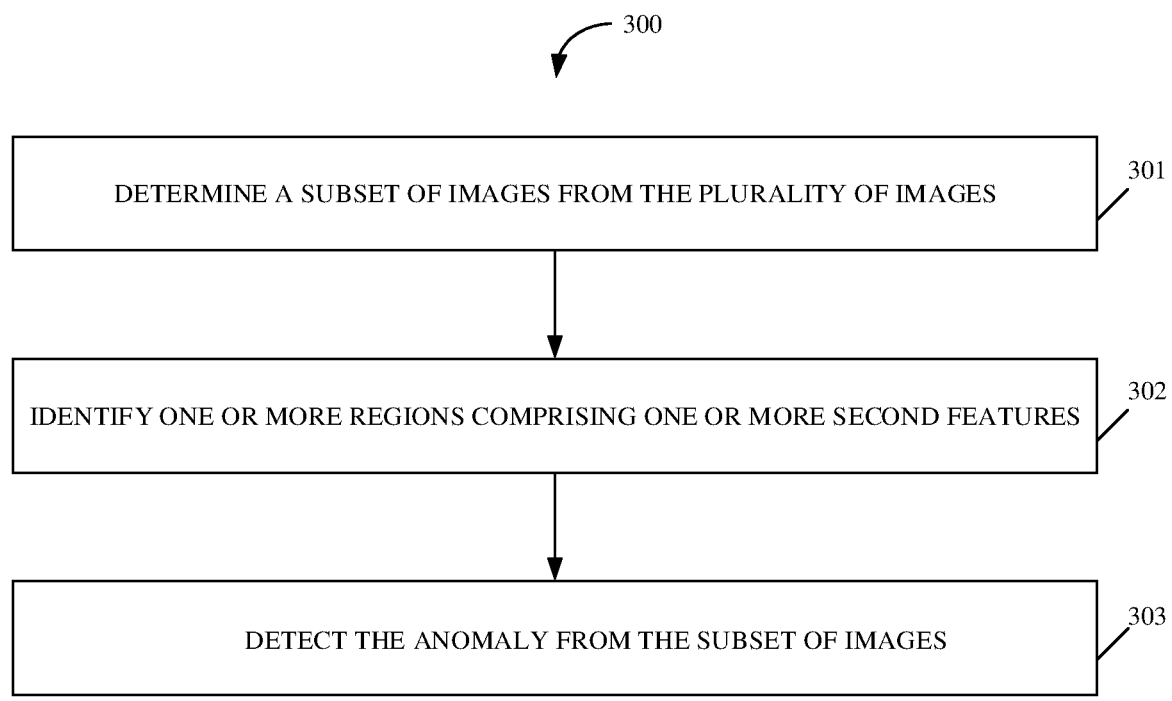
FIG. 3 shows a flowchart illustrating method steps for detecting an anomaly using a plurality of images, in accordance with some embodiment of the present disclosure.

FIG. 3 shows a flowchart illustrating method steps for detecting an anomaly (104) using a plurality of images (101), in accordance with some embodiment of the present disclosure.

The order in which the method (300) may be described is not intended to be construed as a limitation, and any number of the described method blocks may be combined in any order to implement the method. Additionally, individual blocks may be deleted from the methods without departing from the scope of the subject matter described herein. Furthermore, the method may be implemented in any suitable hardware, software, firmware, or combination thereof.

At the step (301), the anomaly detection system (102) determines the subset of images from the plurality of images (101), comprising one or more first features.

In an embodiment, the anomaly detection system (102) may receive the user input (103) indicating the one or more AI based techniques to be used as the first model for determining the subset of images from the plurality of images (101). For example, the user input (103) may indicate a CNN with AlexNet architecture to be used as the first model.

Figures 4A, 4B:
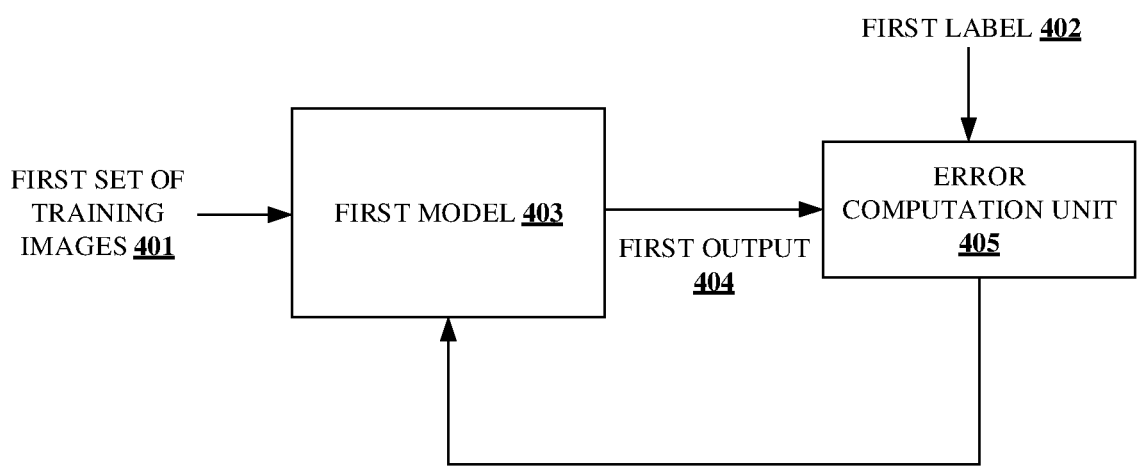
FIG. 4A shows an exemplary illustration of first set of training images and a corresponding label used to train a first model, in accordance with some embodiments of the present disclosure.
FIG. 4B shows an exemplary illustration of training the first model, in accordance with some embodiments of the present disclosure.

In one embodiment, the first model is pre-trained to identify the one or more first features in the plurality of images (101). Further, the first model is pre-trained to determine the subset of images from the plurality of images (101) where the subset of images comprises the one or more first features. The first model is trained using the first set of training images (401), where the first label (402) associated with each image in the first set of training images (401) indicates the presence of the one or more first features or the absence of the one or more first features as shown in FIG. 4A. Further, the first set of training images (401) is provided as the input to the first model (403) as shown in FIG. 4B. The first model (403) detects the one or more first features in each image from the first set of training images (401). The one or more first features detected by the first model (403) is indicated as the output of the first model (403) as shown in FIG. 4B. In a first example, a first output (404) (i.e., the output (404) of the first model (403) used interchangeably in the present disclosure) indicated by a "zero" may denote the absence of the one or more first features corresponding to an image from the first training set provided as the input to the first model (403). In a second example, the first output (404) indicated by a "one" may denote the presence of the one or more first features corresponding to the image from the first training set provided as the input to the first model (403). In another embodiment, the first output (404) indicated by a value in the range from "zero" to "one" may denote the partial presence of the one or more first features.

In an embodiment, the first output (404) obtained from the first model (403) may be provided to an error computation unit (405) as shown in FIG. 4B. The error computation unit may be a part of the training module (212). The error computation unit (405) determines the first error associated with the first model (403) based on the comparison between the output (404) of the first model (403) and the corresponding first label (402) for each image in the first set of training images (401). The person skilled in the art appreciates the use of one or more error computation techniques related to the one or more AI based techniques such as a mean-squared-error, a cross-entropy loss, a Huber loss, and a hinge loss, a Divergence Loss and the like.

In an embodiment, the one or more first parameters associated with the first model (403) is modified based on the first error as shown in FIG. 4B. For example, the one or more parameters of the first model (403) may include at least one of the weight values of the first model (403), connections between plurality of nodes in the first model (403), the learning rate, hyperparameters associated with the first model (403) and the like. Further, the one or more first parameters of the first model (403) may be modified using the first error corresponding to the first set of training images (401) until the first model (403) is trained to determine the presence and the absence of the one or more first features. In one embodiment, the training of the first model (403) may be performed as an offline process and/or as an online process. The trained first model (403) is used to determine the subset of images from the plurality of images in real-time.

Figure 4C:
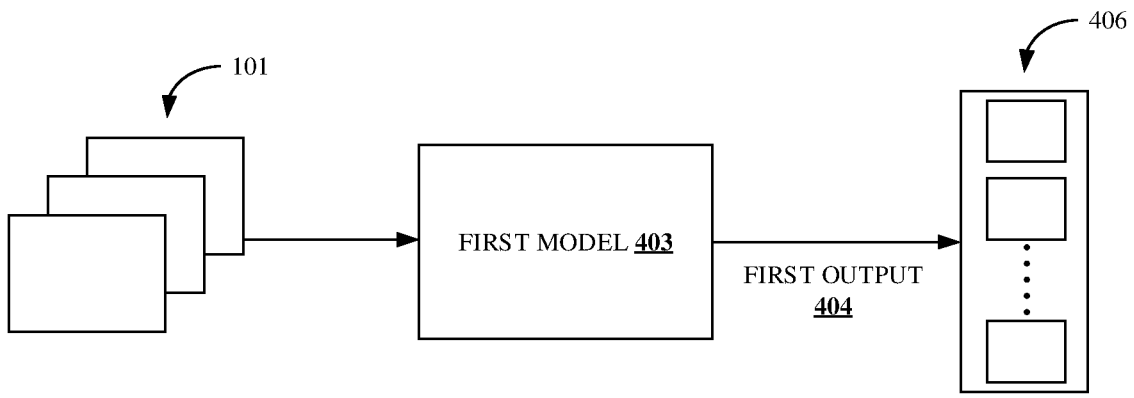
FIG. 4C shows an exemplary illustration of determining subset of images from the plurality of images using the first model, in accordance with some embodiments of the present disclosure.

In an embodiment, the plurality of the images may be obtained by the anomaly detection system (102) for detecting the anomaly (104) via the user input (103). The anomaly detection system (102) may provide each image from the plurality of images (101) as the input to the first model (403) in the anomaly detection system (102) for determining the subset of images (406) as shown in FIG. 4C. The first model (403) is pre-trained to determine the subset of images (406) from the plurality of images (101) is denoted as an inference stage of the first model (403). Further, the anomaly detection system (102) may categorize the image as belonging to the subset of images (406) based on the first output (404) of the first model (403) when the image includes the one or more first features. Furthermore, the anomaly detection system (102) may categorize the image as not belonging to the subset of images (406) based on the first output (404) of the first model (403) when the image does not include the one or more first features. In a first example, when the output (404) of the first model (403) is greater than a pre-defined threshold such as 0.63, the anomaly detection system (102) may categorize the image as belonging to the subset of images (406). In a second example, when the output (404) of the first model (403) is lesser than the pre-defined threshold such as 0.63, the anomaly detection system (102) may categorize the image as belonging to the subset of images (406). The pre-defined threshold may be a number in the range zero to one.

In a first example, consider a ceramic product manufacturing industry, where the plurality of images (101) of the ceramic product is provided to the first model (403). The first model (403) may determine the subset of images (406) using the one or more first features indicative of "an amount of ceramic product visible in the image", "a presence of more than one ceramic product in the image", "blur-free images", "brightness or intensity values of the image" and the like. In a second example, consider the medical images such as Computerized Tomography (CT) scan images of a subject. The first model (403) may determine the subset of images (406) using the one or more first features indicative the "complete presence of an organ such as a lung" and the like.

Referring back to FIG. 3, at the step (302), the anomaly detection system (102) identifies the one or more regions comprising one or more second features in each image from the subset of images (406).

In an embodiment, the anomaly detection system (102) may receive the user input (103) indicating the one or more AI based techniques to be used as the second model for identifying the one or more regions. For example, the user input (103) may indicate an unsupervised learning technique based k-means learning model.

Figure 4D:
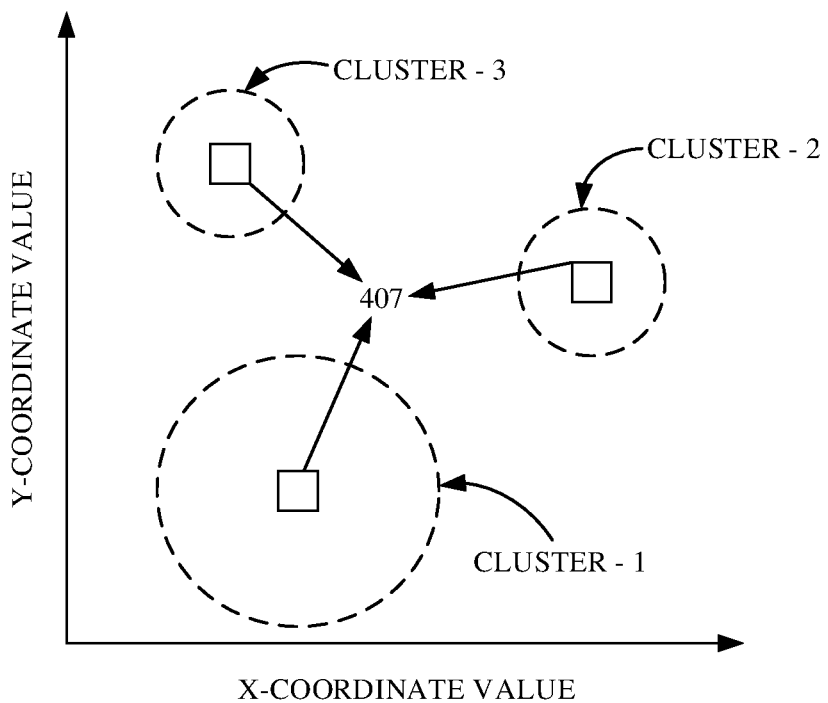
FIG. 4D shows an exemplary illustration of one or more clusters determined using a second model, in accordance with some embodiments of the present disclosure.

In an embodiment, the second model may be pre-trained to identify the presence of one or more second features in the subset of images (406) using the first set of training images (401) with a first label (402) indicating the presence of the one or more first features as shown in FIG. 4D. The second model may learn one or more centroids (407) corresponding to one or more clusters as shown in FIG. 4D. For example, "Cluster—1" may indicate the absence of the one or more second features and "Cluster—2" and "Cluster—3" may indicate the presence of the one or more second features. Further, X-coordinate value and Y-coordinate value may indicate at least one of a co-ordinates of each pixel in the subset of images (406), the intensity value associated with each pixel in the subset of images (406) and the like.

Figure 4E:
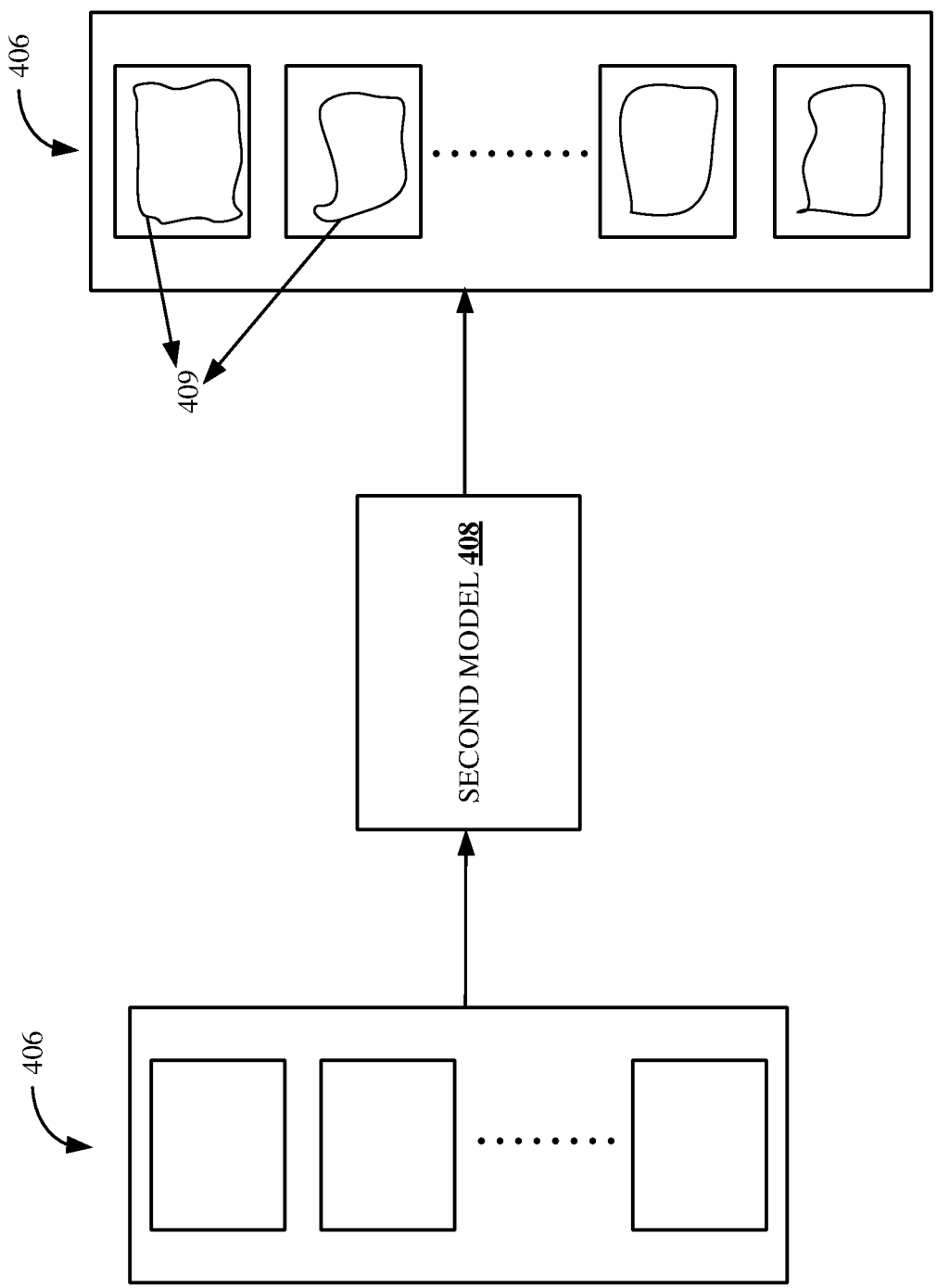
FIG. 4E shows an exemplary identifying one or more regions in the subset of images using a second model, in accordance with some embodiments of the present disclosure.

In an embodiment, the anomaly detection system (102) may identify the one or more regions by categorizing the each pixel of the each image from the subset of images (406) into one or more clusters using the second model. In an example, for each pixel the distance from the one or more centroids (407) is computed and the pixel is categorized into the cluster corresponding to the centroid having minimum distance with the pixel. Further, the anomaly detection system (102) identifies at least one cluster from the one or more clusters that indicate the presence of one or more second features. For example, "Cluster—2 and Cluster—3" may be identified as having the second features as shown in FIG. 4D. Further, the anomaly detection system (102) determines the plurality of pixels corresponding to the at least one cluster for each image based on the output of the second model (408) as shown in FIG. 4E. The plurality of pixels indicates the one or more regions (409) in each image for the subset of images (406) as shown in FIG. 4E. For example, the plurality of pixels corresponding to "Cluster—2 and Cluster—3" indicate the one or more regions (409) in each image for the subset of images (406).

In a first example, consider the ceramic product manufacturing industry, where the subset of images (406) of the ceramic product is provided to the second model (408). The second model (408) may identify the one or more regions (409) in the subset of images (406) indicative of the presence of the one or more second features related to the ceramic product in which the anomaly (104) is expected. In a second example, consider the medical images such as computerized tomography (CT) scan images of a subject. The second model (408) may identify the one or more regions (409) in the subset of images (406) indicative of the presence of the one or more second features related to an organ such as lung or a part of the body of the subject in which the anomaly (104) is expected.

Referring back to FIG. 3, at the step (303), the anomaly detection system (102) detects the anomaly (104) from the subset of images (406) based on the one or more regions (409).

In an embodiment, the anomaly detection system (102) may obtain the user input (103) indicating the one or more AI based techniques to be used as the third model for detecting the anomaly (104) from the subset of images (406). For example, the user input (103) may indicate a deep learning based CNN technique having a Google-net® architecture. Further, the anomaly detection system (102) may obtain the user input (103) indicating the type of the anomalies to be detected using the third model. In a first example, consider the ceramic product manufacturing industry, where the user input (103) may indicate the anomaly detection system (102) to detect only for the presence of the "structural defect" in the ceramic product. In a second example, the user input (103) may indicate the anomaly detection system (102) to detect the presence of the "structural defect", "a paint defect", and the like in the ceramic product.

Figures 4F, 4G:
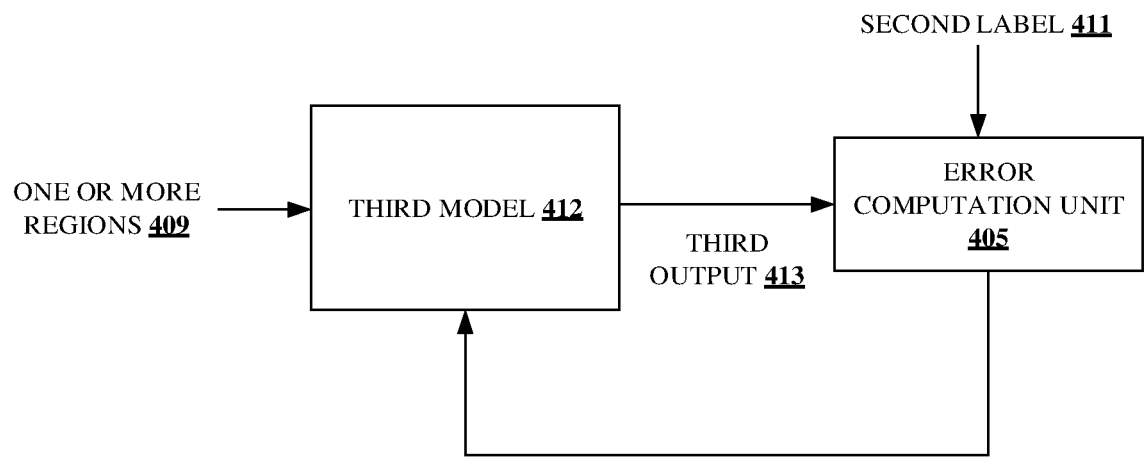
FIG. 4F shows an exemplary illustration of second set of training images and a corresponding second label used to train a third model, in accordance with some embodiments of the present disclosure.
FIG. 4G shows an exemplary training of the third model, in accordance with some embodiments of the present disclosure.

In an embodiment, the third model is pre-trained to detect the anomaly (104), the type of the anomaly (104) and determine the first score associated with the anomaly (104) based on one or more second features. The third model is trained by using a second set of training images (410) and a corresponding second label (411) associated with each image from the second set of training images (410) as shown in FIG. 4F. The second label (411) indicates a presence or absence of the actual anomaly, and the type of the actual anomaly if the presence of the actual anomaly is indicated. Further, the anomaly detection system (102) identifies the one or more regions (409) comprising the one or more second features in the each image from the subset of images (406) as shown in FIG. 4F. The one or more regions (409) may be identified using the second model (408).

In an embodiment, the one or more regions (409) of the each image from the second set of training images (410) is provided as the input to the third model (412) as shown in FIG. 4G. Further, the anomaly (104) and the type of the anomaly (104) is detected based on the one or more second features in the one or more regions (409). The anomaly (104) detected, and the type of the anomaly (104) indicates the output (413) of the third model (412) denoted as third output (413) as shown in FIG. 4G. The phrase "output of the third model (412)" and "third output (413)" is used interchangeably in the present disclosure. Furthermore, the third output (413) is provided as an input to the error computation unit (405) for determining a second error associated with the third model (412). The second error is determined based on a comparison between the output (413) of the third model (412) and the corresponding second label (411) associated with the second set of training images (410). The person skilled in the art appreciates the use of one or more error computation techniques related to the one or more AI based techniques such as the mean-squared-error, the cross-entropy loss, the Huber loss, and the hinge loss, the Divergence Loss and the like. Thereafter, one or more second parameters associated with the third model (412) is modified based on the second error as shown in FIG. 4G. For example, the one or more parameters associated with the third model (412) may include at least one of the weight values of the third model (412), connections between plurality of nodes in the third model (412), the learning rate, the hyperparameters associated with the third model (412) and the like. The trained third model (412) is used for detecting the anomaly (104) in the subset of images (406) in real-time.

Figure 4H:
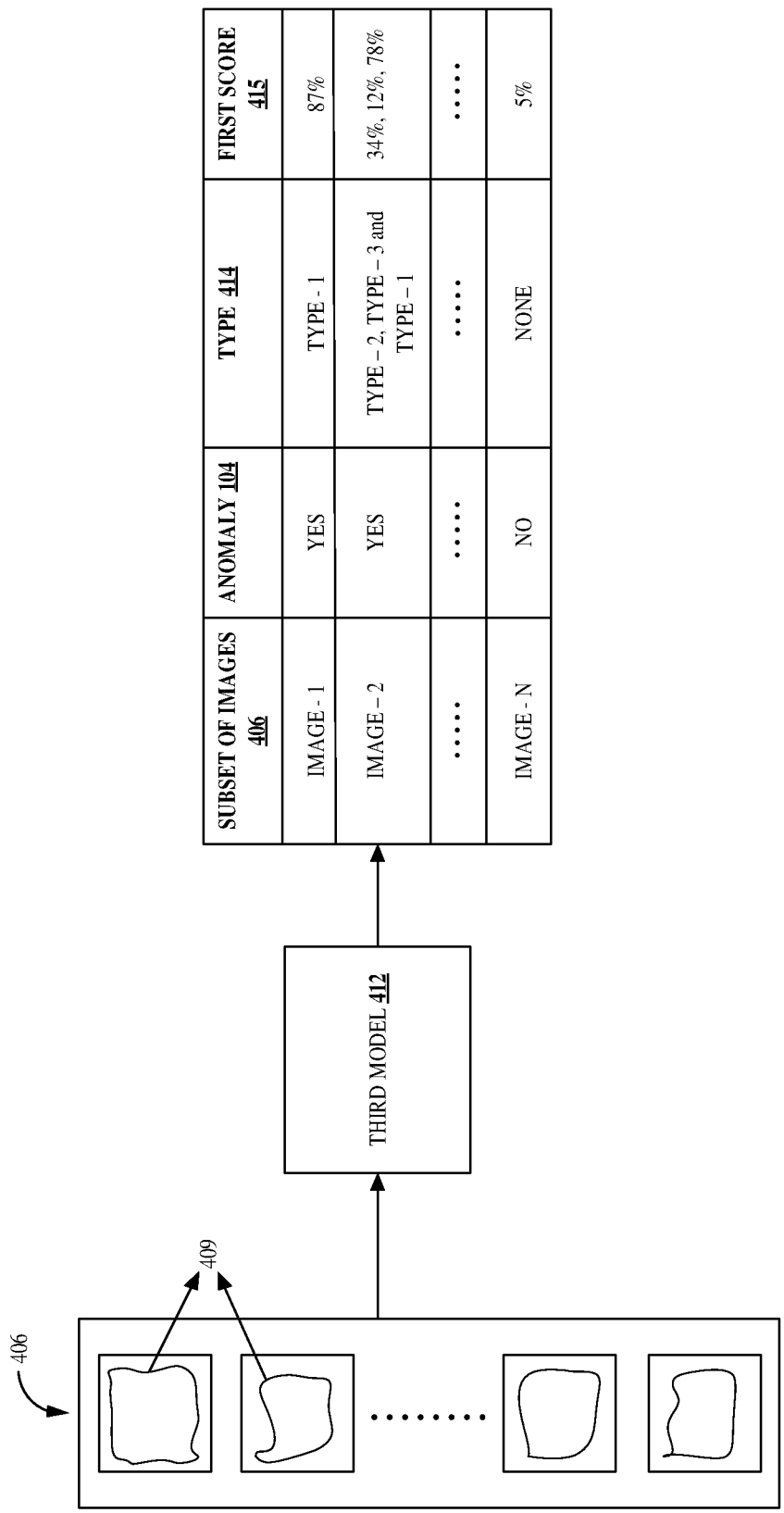
FIG. 4H shows an exemplary illustration of detecting anomaly in the subset of images using the third model, in accordance with some embodiments of the present disclosure.

In an embodiment, the anomaly detection system (102) detects the anomaly (104) by providing the one or more regions (409) of the each image from the subset of images (406) as the input to the third model (412) as shown in FIG. 4H. The third model (412) used to detect the anomaly (104) is denoted as an inference stage of the third model (412). The third output (413) indicates the presence or the absence of the anomaly (104), the type (414) of the anomaly (104), and the first score (415) associated with the each type (414) of the anomaly (104) in each image from the subset of images (406) as shown in FIG. 4H. Further, the anomaly detection system (102) consolidates an output (413) of the third model (412) corresponding to each image for detecting the anomaly (104) in the subset of images (406).

In an embodiment, the anomaly detection system (102) consolidates the output (413) of the third model (412) by computing the count (416) of occurrences of each type (414) of the anomaly (104) in the subset of images (406) as shown in FIG. 4I. Further, the anomaly detection system (102) discards the type (414) of anomaly (104) identified as outliers (417) (410) based on the count (416) of occurrences and the first score (415) as shown in FIG. 4I. If the count (416) of occurrences associated with the type (414) of the anomaly (104) is lesser than a pre-determined threshold value, then the type (414) of the anomaly (104) is identified as the outlier (417) and discarded. If the first score (415) associated with each occurrence of the type (414) of the anomaly (104) is lesser than a pre-determined value, then the type (414) of the anomaly (104) is identified as the outlier (417) and discarded. In one embodiment, the outliers (417) may be identified using at least one of extreme value analysis, probabilistic and statistical modeling, linear regression models, proximity based models, and the like. For example, the "Type (414)—2", "Type (414)—N" and "No Anomaly" are identified as the outliers (417) and discarded based on the count (416) of occurrences and the first score (415) as shown in FIG. 4I. Furthermore, the anomaly detection system (102) aggregates (such as determining mean or average) the first score (415) associated with the each type (414) of the anomaly (104) after discarding the outliers (417). Thereafter, the anomaly detection system (102) determines the anomaly (104) and the type (414) of the anomaly (104) based on the aggregated first score (415). For example, the anomaly detection system (102) detects the presence of the "Type (414)—1" anomaly (104) with a confidence value equal to the aggregated first score (415) (for example, 94%).

In a first example, consider the ceramic product manufacturing industry, where the one or more regions (409) in the subset of images (406) is provided as the input to the third model (412). Further, the output (413) of the third model (412) is consolidated to detect the presence of the anomaly (104) (i.e., the presence of the manufacturing defect) and the type (414) of anomaly (104) as "a crack in the ceramic product with 87% confidence value", "overlapped or distorted pattern painted on the ceramic product with 96% confidence value" and the like. In a second example, consider the medical images such as computerized tomography (CT) scan images of the subject, where the one or more regions (409) in the subset of images (406) is provided as the input to the third model (412). Further, the output (413) of the third model (412) is consolidated to detect the presence of the anomaly (104) (i.e., the disease or the disorder) and the type (414) of anomaly (104) as "COVID-19 with a confidence value of 92%" and the like. In a third example, consider the medical images such as computerized tomography (CT) scan images of the subject, where the one or more regions (409) in the subset of images (406) is provided as the input to the third model (412). Further, the output (413) of the third model (412) is consolidated to detect the absence of the anomaly (104) with a confidence value of 87%.

The method of detecting the anomaly (104) using the plurality of images (101) uses one or more Artificial Intelligence (AI) based techniques to determine the subset of images (406), identify the one or more regions (409) and detect the anomaly (104) from the subset of images (406). Further, the first model (403) used to determine the subset of images (406) filters or removes the one or more images without the one or more first features and/or filters or removes the one or more images with partial one or more first features. The filtering of the subset of images (406) from the plurality of images (101) increases the accuracy of the third model (412) used to detect the anomaly (104) and reduces the computational resources and the time constraint required to detect the anomaly (104). Further, the second model (408) indicates the one or more regions (409) comprising the one or more second features which reduces the computational resources and the time constraint required to detect the anomaly (104) using the third model (412) because the entire image need not be processed to detect the anomaly (104). Furthermore, consolidating the output (413) of the third model (412) improves the accuracy of the detected anomaly (104) due to removal of the outliers (417) which contributes to inaccurate results.

Computer System

Figure 5:
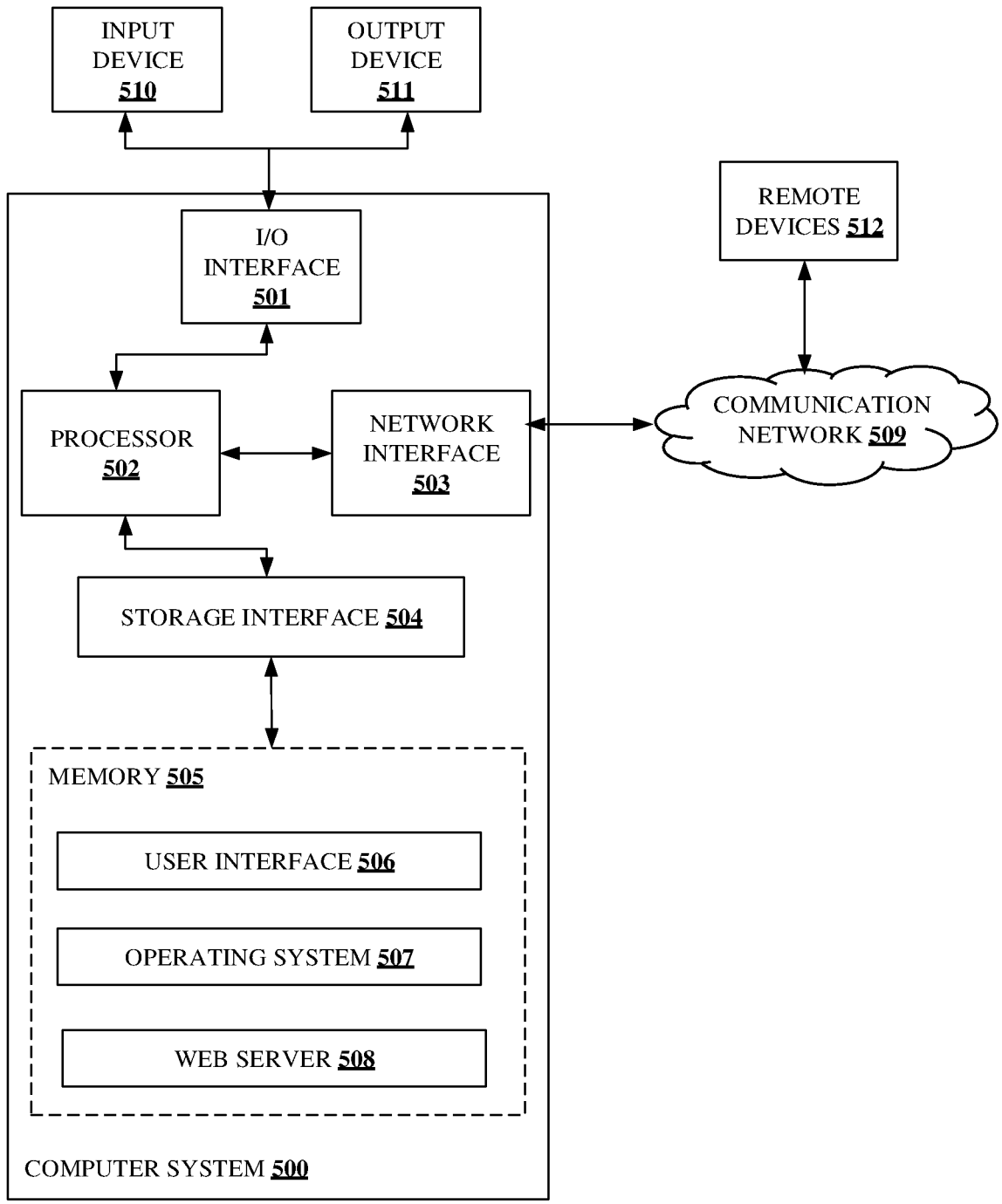
FIG. 5 shows an exemplary computer system for detecting an anomaly using a plurality of images, in accordance with some embodiments of the present disclosure.

FIG. 5 illustrates a block diagram of an exemplary computer system (500) for implementing embodiments consistent with the present disclosure. In an embodiment, the computer system (500) may be used to implement the method of detecting the anomaly (104) using the plurality of images (101). The computer system (500) may comprise a central processing unit ("CPU" or "processor") (502). The processor (502) may comprise at least one data processor for executing program components for dynamic resource allocation at run time. The processor (502) may include specialized processing units such as integrated system (bus) controllers, memory (502) management control units, floating point units, graphics processing units, digital signal processing units, etc.

The processor (502) may be disposed in communication with one or more input/output (I/O) devices (not shown) via I/O interface (501). The I/O interface (501) may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface (501), the computer system (500) may communicate with one or more I/O devices. For example, the input device (510) may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device (511) may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system (500) is connected to the service operator through a communication network (509). The processor (502) may be disposed in communication with the communication network (509) via a network interface (503). The network interface (503) may communicate with the communication network (509). The network interface (503) may employ connection protocols including, without limitation, direct connect, Ethernet (e.g., twisted pair 10/100/1000 Base T), transmission control protocol/Internet protocol (TCP/IP), token ring, IEEE 802.11a/b/g/n/x, etc. The communication network (509) may include, without limitation, a direct interconnection, e-commerce network, a peer to peer (P2P) network, local area network (LAN), wide area network (WAN), wireless network (e.g., using Wireless Application Protocol), the Internet, Wi-Fi, etc. Using the network interface (503) and the communication network (509), the computer system (500) may communicate with the one or more service operators.

In some embodiments, the processor (502) may be disposed in communication with a memory (505) (e.g., RAM, ROM, etc. not shown in FIG. 5 via a storage interface (504). The storage interface (504) may connect to memory (505) including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory (505) may store a collection of program or database components, including, without limitation, user interface (506), an operating system (507), web server (508) etc. In some embodiments, computer system (500) may store user/application data (506), such as the data, variables, records, etc. as described in this disclosure. Such databases may be implemented as fault-tolerant, relational, scalable, secure databases such as Oracle or Sybase.

The operating system (507) may facilitate resource management and operation of the computer system (500). Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM®OS/2®, MICROSOFT® WINDOWS® (XP®, VISTA®/7/8, 10 etc.), APPLE® IOS®, GOOGLE™ ANDROID™, BLACKBERRY® OS, or the like.

In some embodiments, the computer system (500) may implement a web browser (not shown in the Figure) stored program component. The web browser may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers (508) may utilize facilities such as AJAX, HTML, ADOBE® FLASH®, JAVASCRIPT®, JAVA®, Application Programming Interfaces (APIs), etc. In some embodiments, the computer system (500) may implement a mail server stored program component not shown in the Figure). The mail server may be an Internet mail server such as Microsoft Exchange, or the like. The mail server may utilize facilities such as Active Server Pages (ASP), ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® Exchange, Post Office Protocol (POP), Simple Mail Transfer Protocol (SMTP), or the like. In some embodiments, the computer system (500) may implement a mail client stored program component not shown in the Figure). The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present invention. A computer-readable storage medium (103) refers to any type of physical memory on which information or data readable by a processor may be stored. Thus, a computer-readable storage medium (103) may store instructions for execution by one or more processors, including instructions for causing the processors to perform steps or stages consistent with the embodiments described herein. The term "computer-readable medium" should be understood to include tangible items and exclude carrier waves and transient signals, i.e., non-transitory. Examples include Random Access memory (RAM), Read-Only memory (ROM), volatile memory, non-volatile memory, hard drives, Compact Disc (CD) ROMs, Digital Video Disc (DVDs), flash drives, disks, and any other known physical storage media.

In an embodiment, the computer system (500) may comprise remote devices (512). The remote devices (512) may indicate a device for obtaining the user input (103), the pre-trained first model, pre-trained third model, the plurality of the images and the like through the communication network (509).

In light of the above-mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it may be readily apparent that more than one device/article (whether or not they cooperate) may be used in place of a single device/article. Similarly, where more than one device or article is described herein (whether or not they cooperate), it may be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments may be apparent to those skilled in the art. The various aspects and embodiments disclosed herein are for purposes of illustration and are not intended to be limiting, with the true scope being indicated by the following claims.

REFERRAL NUMERALS

| Reference number | Description |
| --- | --- |
| 101 | Plurality of images |
| 102 | Anomaly detection system |
| 103 | User input |
| 104 | anomaly |
| 201 | I/O interface |
| 202 | Memory |
| 203 | Processor |
| 204 | Data |
| 205 | Image data |
| 206 | Feature data |
| 207 | Anomaly data |
| 208 | Other data |
| 209 | Modules |
| 210 | Subset module |
| 211 | Feature identification module |
| 212 | Training module |
| 213 | Anomaly detection module |
| 214 | Other module |
| 401 | First set of training images |
| 402 | First label |
| 403 | First model |
| 404 | First output |
| 405 | Error computation unit |
| 406 | Subset of images |
| 407 | One or more centroids |
| 408 | Second model |
| 409 | One or more regions |
| 410 | Second set of training images |
| 411 | Second label |
| 412 | Third model |
| 413 | Third output |
| 414 | Type |
| 415 | First score |
| 416 | Count |
| 417 | Outliers |
| 500 | Computer System |
| 501 | I/O interface |
| 502 | Processor |
| 503 | Network Interface |

| Reference number | Description |
| --- | --- |
| 504 | Storage Interface |
| 505 | Memory |
| 506 | User Interface |
| 507 | Operating System |
| 508 | Web Server |
| 509 | Communication Network |
| 510 | Input Device |
| 511 | Output Device |
| 512 | Remote Devices |

I claim:

1. A method for detecting an anomaly using a plurality of images, the method comprising:
 determining, by an anomaly detection system, a subset of images from the plurality of images, comprising one or more first features;
 identifying, by the anomaly detection system, one or more regions comprising one or more second features in each image from the subset of images;
 detecting, by the anomaly detection system, the anomaly from the subset of images based on the one or more regions, wherein detecting the anomaly comprises:
  providing, by the anomaly detection system, the one or more regions in each image from the subset of images as an input to a third model, wherein the third model is pre-trained to detect the anomaly, a type of the anomaly, and a first score associated with the anomaly detected based on the one or more second features;
  computing, by the anomaly detection system, a count of occurrences of each type of the anomaly in the subset of images;
  discarding, by the anomaly detection system, the type of anomaly identified as outliers based on the count of occurrences and the first score;
  aggregating, by the anomaly detection system, the first score associated with each type of the anomaly after discarding the outliers; and
  determining, by the anomaly detection system, the anomaly and the type of the anomaly based on the aggregated first score.

2. The method of claim 1, wherein determining the subset of images, identifying the one or more regions and detecting the anomaly from the subset of images are performed using one or more Artificial Intelligence (AI) based techniques.

3. The method of claim 1, wherein determining the subset of images comprises:
 providing each image from the plurality of images as an input to a first model in the anomaly detection system, wherein the first model is pre-trained to identify the one or more first features in the plurality of images; and
 categorizing, based on an output of the first model, each image as belonging to the subset of images; or
 not belonging to the subset of images.

4. The method of claim 3, wherein training the first model comprises:
 providing a first set of training images as the input to the first model, wherein a first label associated with each image in the first set of training images indicates the presence of the one or more first features;
 detecting the one or more first features in each image from the first set of training images, wherein detecting the one or more first features indicates the output of the first model;
 determining a first error associated with the first model based on a comparison between the output of the first model and the corresponding first label for the first set of training images; and
 modifying one or more first parameters associated with the first model based on the first error.

5. The method of claim 1, wherein identifying the one or more regions comprises:
 categorizing each pixel of each image from the subset of images into one or more clusters using a second model in the anomaly detection system;
 identifying at least one cluster from the one or more clusters indicate the presence of one or more second features; and
 determining a plurality of pixels corresponding to the at least one cluster for each image, wherein the plurality of pixels indicate the one or more regions.

6. The method of claim 1, wherein training the third model comprises:
 identifying the one or more regions comprising one or more second features in each image from a second set of training images;
 providing the one or more regions of the each image from the second set of training images as the input to the third model, wherein a second label associated with each image from the second set of training images indicates an actual anomaly, and the type of the actual anomaly;
 detecting the anomaly and the type of the anomaly based on the one or more second features in the one or more regions, wherein the anomaly detected, and the type of the anomaly indicates the output of the third model;
 determining a second error associated with the third model based on a comparison between the output of the third model and the corresponding second label associated with the second set of training images; and
 modifying one or more second parameters associated with the third model based on the second error.

7. An anomaly detection system for detecting an anomaly using a plurality of images, wherein the anomaly detection system comprises:
 a processor; and
 a memory communicatively coupled to the processor, wherein the memory stores the processor instructions, which, on execution, causes the processor to:
 determine a subset of images from the plurality of images, comprising one or more first features;
 identify one or more regions comprising one or more second features in each image from the subset of images;
 detect the anomaly from the subset of images based on the one or more regions by;
  providing the one or more regions of the each image as an input to a third model, wherein the third model is pre-trained to detect the anomaly, a type of the anomaly, and a first score associated with the anomaly detected based on one or more second features;
  computing a count of occurrences of each type of the anomaly in the subset of images;
  discarding the type of anomaly identified as outliers based on the count of occurrences and the first score;
  aggregating the first score associated with the each type of the anomaly after discarding the outliers; and
  determining the anomaly and the type of the anomaly based on the aggregated first score.

8. The anomaly detection system of claim 7, wherein the processor is configured to determine the subset of images, identify the one or more regions and detect the anomaly from the subset of images are performed using one or more Artificial Intelligence (AI) based techniques.

9. The anomaly detection system of claim 7, wherein the processor is configured to determine the subset of images comprises:
providing each image from the plurality of images as an input to a first model in the anomaly detection system, wherein the first model is pre-trained to identify the one or more first features in the plurality of images; and
categorizing, based on an output of the first model, each image as belonging to the subset of images; or
not belonging to the subset of images.

10. The anomaly detection system of claim 7, wherein the processor is configured to train the first model comprises:
providing a first set of training images as the input to the first model, wherein a first label associated with each image in the first set of training images indicates the presence of the one or more first features;
detecting the one or more first features in each image from the first set of training images, wherein detecting the one or more first features indicates the output of the first model;
determining a first error associated with the first model based on a comparison between the output of the first model and the corresponding first label for the first set of training images; and
modifying one or more first parameters associated with the first model based on the first error.

11. The anomaly detection system of claim 7, wherein the processor is configured to identify the one regions comprises:
categorizing each pixel of each image from the subset of images into one or more clusters using a second model in the anomaly detection system;
identifying at least one cluster from the one or more clusters indicate the presence of one or more second features; and
determining a plurality of pixels corresponding to the at least one cluster for each image, wherein the plurality of pixels indicate the one or more regions.

12. The anomaly detection system of claim 7, wherein the processor is configured to train the third model comprises:
identifying the one or more regions comprising one or more second features in each image from a second set of training images;
providing the one or more regions of the each image from the second set of training images as the input to the third model, wherein a second label associated with each image from the second set of training images indicates an actual anomaly, and the type of the actual anomaly;
detecting the anomaly and the type of the anomaly based on the one or more second features in the one or more regions, wherein the anomaly detected, and the type of the anomaly indicates the output of the third model;
determining a second error associated with the third model based on a comparison between the output of the third model and the corresponding second label associated with the second set of training images; and
modifying one or more second parameters associated with the third model based on the second error.

13. A non-transitory computer readable medium including instructions stored thereon that when processed by at least one processor cause a device to perform operations comprising:
determining, by an anomaly detection system, a subset of images from the plurality of images, comprising one or more first features;
identifying, by the anomaly detection system, one or more regions comprising one or more second features in each image from the subset of images;
detecting, by the anomaly detection system, the anomaly from the subset of images based on the one or more regions, wherein detecting the anomaly comprises:
providing, by the anomaly detection system, the one or more regions of the each image as an input to a third model, wherein the third model is pre-trained to detect the anomaly, a type of the anomaly, and a first score associated with the anomaly detected based on one or more second features;
computing, by the anomaly detection system, a count of occurrences of each type of the anomaly in the subset of images;
discarding, by the anomaly detection system, the type of anomaly identified as outliers based on the count of occurrences and the first score;
aggregating, by the anomaly detection system, the first score associated with each type of the anomaly after discarding the outliers; and
determining, by the anomaly detection system, the anomaly and the type of the anomaly based on the aggregated first score.

14. The media of claim 13, wherein the instructions cause the processor to determine the subset of images comprises:
providing each image from the plurality of images as an input to a first model in the anomaly detection system, wherein the first model is pre-trained to identify the one or more first features in the plurality of images; and
categorizing, based on an output of the first model, each image as belonging to the subset of images; or
not belonging to the subset of images.

15. The media of claim 13, wherein the instructions causes the processor to identify the one or more regions comprises:
categorizing each pixel of each image from the subset of images into one or more clusters using a second model in the anomaly detection system;
identifying at least one cluster from the one or more clusters indicate the presence of one or more second features; and
determining a plurality of pixels corresponding to the at least one cluster for each image, wherein the plurality of pixels indicate the one or more regions.

* * * * *